March 21, 1939.   E. A. HILDE   2,151,207
SAFETY TRACTOR HITCH
Filed Jan. 20, 1938   2 Sheets-Sheet 1
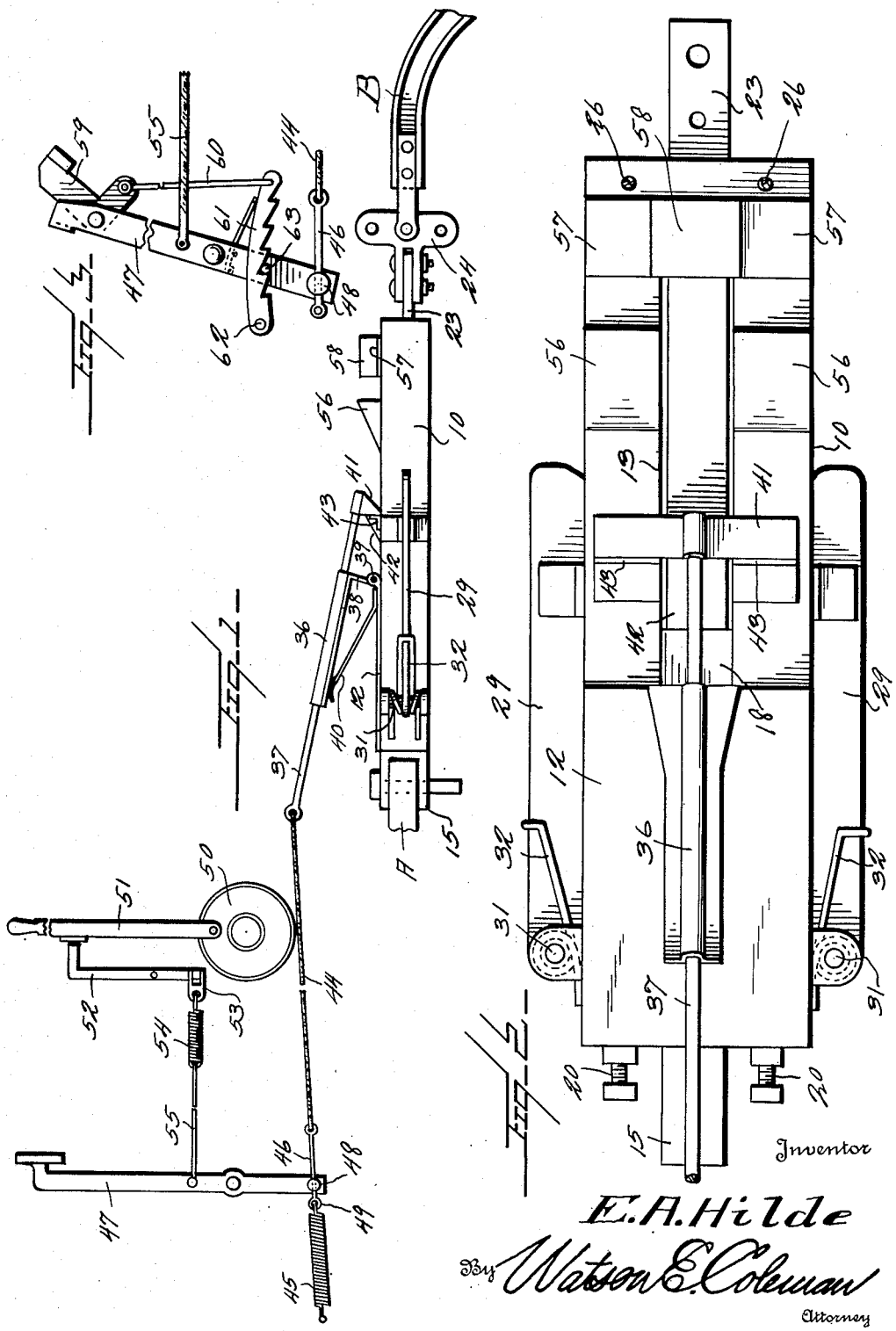
Inventor
E. A. Hilde
By Watson E. Coleman
Attorney March 21, 1939. E. A. HILDE 2,151,207
SAFETY TRACTOR HITCH
Filed Jan. 20, 1938 2 Sheets-Sheet 2
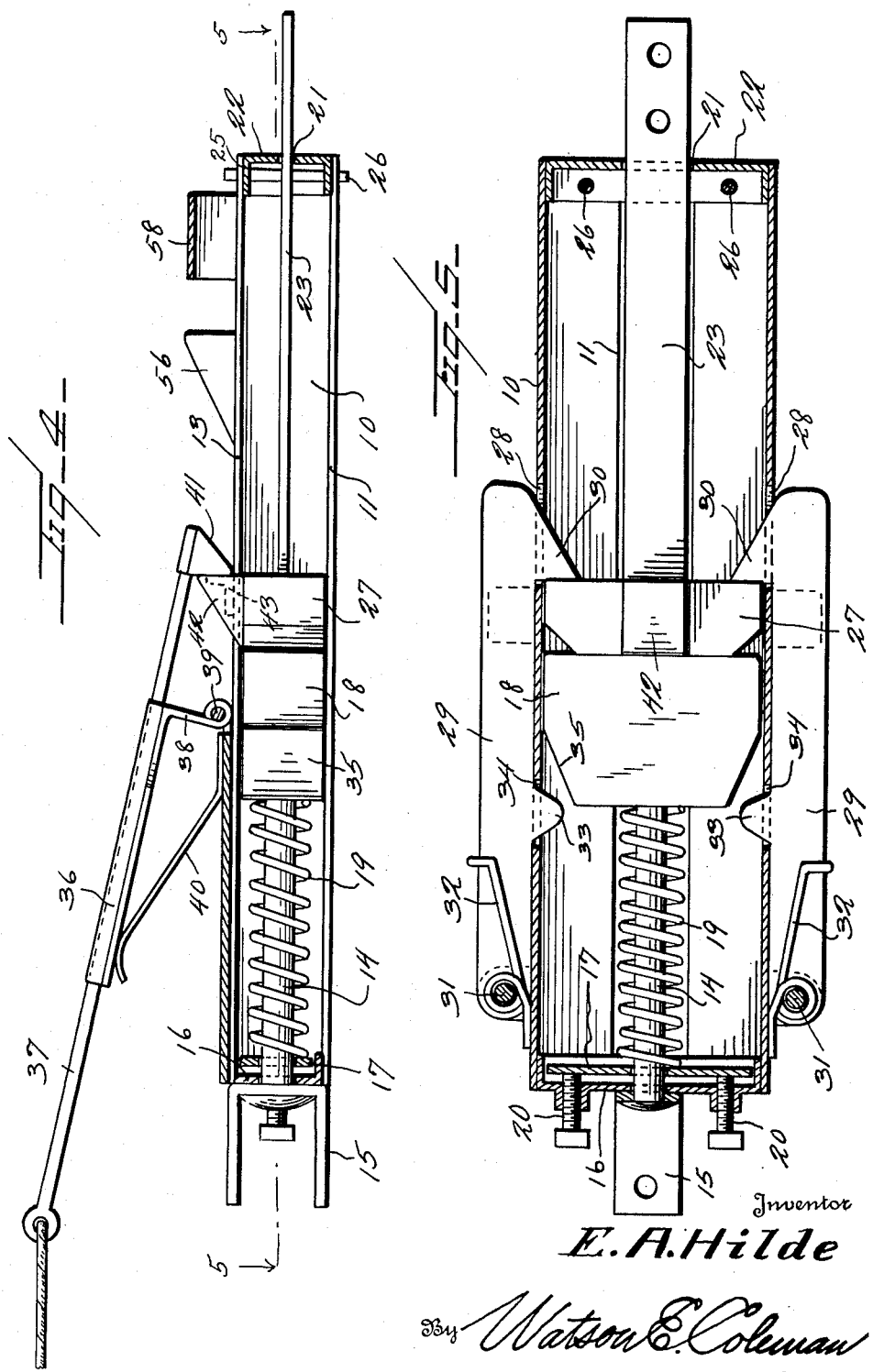
Inventor
E. A. Hilde
By Watson E. Coleman
Attorney Patented Mar. 21, 1939

2,151,207

UNITED STATES PATENT OFFICE 2,151,207

SAFETY TRACTOR HITCH

Eddie A. Hilde, Rothsay, Minn.

Application January 20, 1938, Serial No. 185,985

10 Claims. (Cl. 180—14.5)

This invention relates to means for hitching tractors to plows and other implements of this nature and the general object of the invention is to provide a hitch which, if the plow or other implement is stopped in its forward movement, will act to stop the tractor automatically.

Another object is to provide a device of this character which first cushions the action of the stopped plow or other implement on the tractor, then automatically releases the clutch on the tractor and applies the brake and which then, if there is a still further forward movement of the tractor, acts to cause certain break-pins to break and thus entirely disengage the drawn implement from the tractor.

A further object is to provide means whereby the driver of the tractor may operate the brake and the clutch entirely independently of the automatic brake and clutch operating means and further to provide means whereby the automatic means will lock the clutch and brake in applied position against reverse movement, which means is releasable by the operator.

Other objects will appear in the course of the following description.

My invention is illustrated in the accompanying drawings wherein:

Fig. 1 is a side elevation of my tractor hitch showing a clutch operating pedal and a brake operating means diagrammatically and in connection with the hitch.

Fig. 2 is a top plan view of the hitch shown in Fig. 1.

Fig. 3 is a detail elevation showing a modification of the clutch disengaging means and clutch pedal.

Fig. 4 is a longitudinal medial section of the structure shown in Fig. 2.

Fig. 5 is a horizontal section on the line 5—5 of Fig. 4.

Referring to the drawings and particularly Figs. 2, 4 and 5, 10 designates an elongated housing rectangular in cross-section, this housing being formed on its underface with a longitudinally extending slot 11. The forward end of the housing is covered by a plate 12. The rear portion of the housing rearward of this plate is longitudinally slotted, as at 13. Disposed within the forward end of the housing is a drawbar 14 having a clevis 15 at its forward end whereby, as shown diagrammatically in Fig. 1, it may be connected to the drawbar A of a tractor. The drawbar 14 passes out through an opening in the end wall 16 of the housing and disposed inward of this end wall is a plate 17. The drawbar 14 carries upon it the head 18 which has a width equal to the width of the housing and slides between the side walls of the housing. Disposed between the plate 17 and this head 18 is a coiled compression spring 19 which urges the drawbar 14 toward the right in Figs. 4 and 5 or into the housing. The plate 17 constitutes an abutment for the spring 19 and is adjustable toward or from the head 18 by means of the adjusting screws 20 which pass through the end wall 16 and bear against the plate 17. By this means, the tension of the spring 19 may be controlled or regulated. Entering through an aperture 21 in the rear wall 22 of the housing is a drawbar 23 which, as illustrated in Fig. 1, is adapted to be attached to a yoke or clevis 24 in turn connected to the plow beam B. The end wall 22, as shown in Figs. 4 and 5, is flanged at 25 and wooden or other frangible break-pins 26 are disposed through this flange. The drawbar 23 carries upon it the cross-head 27 which is guided between the side walls of the housing 10. The middle portion of this cross-head extends upward through the slot 13 for a purpose to be later described. The side walls of the housing are slotted at 28 (see Fig. 5) and pivoted at their forward ends to the forward ends of these side walls of the housing are the two latches 29 which at their rear ends carry inwardly projecting lugs 30 which are forwardly and inwardly beveled upon their rear faces. These latches 29 are pivoted to the housing at 31 and springs 32 act to force the latches inward. Each latch on its inside face adjacent its middle is formed with an inwardly protruding bevel-edged lug 33 which extends through a slot 34 formed in the side wall of the housing. The lugs 30 on these latches normally prevent the retraction of the cross-head 27 and of the drawbar 23. When, however, the forward drawbar 14 is pulled forward against the action of the spring 19, the forward beveled faces 35 of the head 18 cam against the inwardly projecting lugs 33 and force these lugs with the corresponding latches 29 outward, thus releasing the cross-head 27, so that the cross-head may move rearward.

When the cross-head moves rearward, it is desirable to automatically throw out the clutch on the tractor and apply the brakes. To this end, I mount upon the upper face of the housing 10 a guide sleeve 36 (see Fig. 4) through which a rod 37 extends. This guide sleeve is supported by an angular bracket 38 pivoted at 39 to the upper face of the housing. A leaf spring 40 urges the guide 36 upward into an upwardly and forwardly inclined position. At its rear end the rod 37 carries upon it a head 41, the rear face of which is beveled. The middle of the cross-head 27, as before stated, carries upon it the upwardly projecting triangular abutment 42 and the head 41 is adapted, under normal circumstances, to engage against this abutment 42. This head 41 also engages against the angular flanges 43 disposed on each side of the slot 13, as shown in Fig. 2, and as indicated in dotted lines in Fig. 4. The forward end of this rod 37 is formed for connection to a cable 44 which extends forward to the tractor and is connected to a spring 45, which at its forward end is attached to some fixed portion of the tractor. Between the cable and the spring there is disposed a smooth rod 46. The tractor carries upon it the usual clutch operating lever 47 which is shown diagrammatically in Fig. 1 (the clutch not being shown) and this lever has projecting laterally from it the pin 48 apertured for the free passage of the rod 46. The rod is provided with the eye 49 which, when the rod 46 is retracted, abuts against the pin 48 and thus the retraction of the rod causes the retraction of the lower end of the lever 47 and disconnects the clutch.

A brake drum and braking mechanism is diagrammatically shown in Fig. 1 as forming part of the tractor and is designated generally 50. This is provided with a brake applying lever 51 likewise diagrammatically shown. Associated with the brake lever 51 is a lever 52 having an angular upper end normally bearing against the brake lever 51. The lower end of this lever 52 is provided with a yoke 53 connected to a contractile spring 54 in turn connected by a rod 55 to the clutch lever 47. Thus when the lower end of the clutch lever is pulled rearward, the upper end will move forward, pull upon the rod 55 and the spring 54 and force the upper end of the lever 52 against the brake lever 51 applying the brake. Rearward of the abutments 43 and upon the upper face of the housing 10 are the upwardly and rearwardly inclined elements 56 and rearward of these elements 56 there is disposed the transverse brace 57 which at its ends is attached to the upper wall of the housing on each side of the slot 13, the middle of this brace being elevated at 58 to permit the passage of the lug 42 under certain circumstances.

The operation of this mechanism is as follows:

If, by any chance, the implement, whose stock or beam is designated B, should catch upon a root, stone or the like, the first action will be for the drawbar of the tractor and the drawbar 14 to move forward, compressing the spring 19. If the implement is still held from forward movement, the head 18 moves forward sufficiently to force out the latches 29. This releases the cross-bar 27 which is then free to move rearward against the action of the spring 45. This rearward movement releases the clutch and applies the brake. Under some circumstances, as for instance, when the tractor is on a downhill grade, the tractor may still continue to move forward and in that case, the drawbar 26 continues to move rearward, causing the head 41 to ride upon the wedge-shaped elements 56 to thereby disengage the head 41 from the abutments 42. Under these circumstances, the cross-head 27 will continue to move rearward and eventually strike the break-pins 26, braking these break-pins and disengaging the drawbar 23 entirely from the housing.

Assuming that the drawbar 23 has not moved rearward to the extreme end of its movement and broken the pins 26, but that the tractor has come to a stop, then the operator disengages the implement from the root or stone which is holding it and backs the tractor. This causes the head 18 to first push out again the latches 29 and then release these latches so that they spring inward. The continued further rearward movement of the tractor forces the housing rearward, causing the cross-head 27 to move forward relative to the housing and the cross-head bearing against the beveled inner faces of the lugs or hooks 30 forces these latches outward until the cross head 27 has passed the lugs 30, when the latch springs inward again, thus latching the parts in their original position. The cross-head 27, as it moves forward relative to the housing, lifts the triangular head 41 on the rod 37 and tilts this rod until these abutment members 42 pass the head 41, whereupon the head drops into place behind the abutment members 42 and the parts are in the position shown in Figs. 4 and 5.

In Fig. 3, I have illustrated a modified form of the clutch lever. In this figure, the clutch lever is designated 47 and the pin is designated 48, as before, but the upper end of the clutch lever is provided with a pivoted element 59 pivoted to the upper end of the clutch lever and adapted to be forced forward by the hand of the operator. This element 59 is in the form of a bell crank lever and connected to the short arm of this bell crank lever is a link 60 which in turn is connected to the free end of a ratchet bar 61 pivoted at 62 upon the frame of the tractor. With this construction, the rearward movement of the housing will cause a rearward movement of the cable 44 and of the rod 48, which will have a certain slippage through the pin 48 as previously described. Eventually when the eye of the rod 46 reaches the pin 48, the lower end of the clutch lever will be moved rearward, the pin 63 on the clutch lever riding over the teeth of the ratchet bar 61 in an obvious manner. This releases the clutch and sets the brake, as before described, but reverse movement of the clutch lever is prevented by the pin 63 engaging the ratchet teeth. Thus the clutch is held in its open position until released by the operator depressing the member 59 and lifting the ratchet bar 61. It will be seen that in both Figs. 1 and 3, the clutch lever is free to be moved in a direction permitting the operator to release the clutch at will by reason of the fact that the pin 48 slides upon the rod 46.

It will be seen that I have provided a tractor hitch which entirely relieves the tractor from strain when the drawn implement meets with an impediment to its forward movement. The first strain is taken up by the spring 19. Then if the strain still continues, the rear drawbar is released so that the housing may move forward independently of this rear drawbar. This causes the release of the clutch and the application of the brake and if still further forward movement of the housing occurs, the rear drawbar snaps the break-pins 26 in the manner heretofore described, to entirely disengage the housing from the drawn implement. It will be likewise seen that it is not necessary for the driver to dismount from the machine except to disengage the drawn implement from the impediment but that he may back the tractor until he has again brought the parts to the position shown in Figs. 2, 4 and 5.

While I have illustrated certain details of construction and arrangement of parts which I have found particularly satisfactory in practice, I do not wish to be limited to these details as obviously these may be varied in many ways without departing from the spirit of the invention as defined in the appended claims.

What is claimed is:

1. The combination with a tractor having a clutch lever and a brake lever, of a tractor hitch including a housing, a drawbar longitudinally movable within the housing and adapted to be connected to a drawn implement, a forward drawbar adapted to be connected to the tractor and movable longitudinally within the housing under predetermined strain, means latching the first-named drawbar to the housing and against longitudinal movement relative thereto, the second-named drawbar having means for releasing said latching means upon a predetermined forward movement of the second-named drawbar relative to the housing, and means operatively connecting the first-named drawbar to the clutch lever and brake lever and constructed and arranged to shift these levers to a clutch releasing and brake applying position when the first-named drawbar moves rearward relative to the housing.

2. A tractor hitch, including a housing open at the rear end, a forward drawbar disposed within the housing for longitudinal movement, a spring resisting forward movement of the forward drawbar, a rear drawbar disposed within the housing for longitudinal movement, means latching the rear drawbar against rearward movement relative to the housing, means releasing said latching means upon a predetermined forward movement of the forward drawbar relative to the housing, and frangible means at the rear end of the housing broken by a predetermined rearward movement of the rear drawbar relative to the housing to permit the housing and rear drawbar to completely disconnect.

3. A tractor hitch, including a housing, a forward drawbar disposed within the housing for longitudinal movement and having a head at its rear end, a spring resisting forward movement of the drawbar, a rear drawbar disposed within the housing for longitudinal movement, latches engaging the rear drawbar and holding it against rearward movement relative to the housing, and means on the head of the forward drawbar acting to release said latches upon a predetermined forward movement of the head relative to the housing.

4. A tractor hitch, including a housing, a forward drawbar disposed within the housing for longitudinal movement and having a head at its rear end, a spring resisting forward movement of the drawbar, a rear drawbar disposed within the housing for longitudinal movement, latches engaging the rear drawbar and holding it against rearward movement relative to the housing, means on the head of the forward drawbar acting to release said latches upon a predetermined forward movement of the head relative to the housing, and a clutch lever and brake lever operating rod engaged by the rear drawbar and retracted relative to the housing by a rearward movement of the rear drawbar relative to the housing.

5. A tractor hitch, including a housing open at its rear end, a forward drawbar disposed within the housing for longitudinal movement, a spring in the housing resisting forward movement of the drawbar, the drawbar having a head at its rear end, a rear drawbar disposed within the housing for longitudinal movement and having a cross-head at its forward end formed with an upwardly extending element, the housing having a longitudinally extending opening through which said element projects, latching means normally engaging the cross-head of the rear drawbar and holding the rear drawbar against rearward movement relative to the housing, means on the head of the forward drawbar engaging with and releasing said latching means upon a predetermined forward movement of the forward drawbar relative to the housing, and means for shifting the clutch lever and brake lever of a tractor to a clutch releasing and brake applying position upon a movement of the rear drawbar relative to the housing including a guide pivotally mounted upon the housing and extending longitudinally thereof, and a rod extending through said guide and having a head at its rear end engageable behind the projecting element on the rear drawbar.

6. A tractor hitch, including a housing open at its rear end, a forward drawbar disposed within the housing for longitudinal movement, a spring in the housing resisting forward movement of the drawbar, the drawbar having a head at its rear end, a rear drawbar disposed within the housing for longitudinal movement and having a cross-head at its forward end formed with an upwardly extending element, the housing having a longitudinally extending opening through which said element projects, latching means normally engaging the cross-head of the rear drawbar and holding the rear drawbar against rearward movement relative to the housing, means on the head of the forward drawbar engaging with and releasing said latching means upon a predetermined forward movement of the forward drawbar relative to the housing, means for shifting the clutch lever and brake lever of a tractor to a clutch releasing and brake applying position upon a movement of the rear drawbar relative to the housing, including a guide pivotally mounted upon the housing and extending longitudinally thereof, a rod extending through said guide and having a head at its rear end engageable behind the projecting element on the rear drawbar, and means on the housing adjacent the rear end thereof engageable with the head on said rod and acting to lift the head from its engagement with the upstanding element on the rear drawbar when the rear drawbar has been drawn rearward relative to the housing a predetermined distance.

7. A tractor hitch, including a housing open at its rear end, a forward drawbar disposed within the housing for longitudinal movement, a spring in the housing resisting forward movement of the drawbar, the drawbar having a head at its rear end, a rear drawbar disposed within the housing for longitudinal movement and having a cross-head at its forward end formed with an upwardly extending element, the housing having a longitudinally extending opening through which said element projects, latching means normally engaging the cross-head of the rear drawbar and holding the rear drawbar against rearward movement relative to the housing, means on the head of the forward drawbar engaging with and releasing said latching means upon a predetermined forward movement of the forward drawbar relative to the housing, means for shifting the clutch lever and brake lever of a tractor to a clutch releasing and brake applying position upon a movement of the rear drawbar relative to the housing, including a guide pivotally mounted upon the housing and extending longitudinally thereof, a rod extending through said guide and having a head at its rear end engageable behind the projecting element on the rear drawbar, and means on the housing adjacent the rear end thereof engageable with the head on said rod and acting to lift the head from its engagement with the upstanding element on the rear drawbar when the rear drawbar has been drawn rearward relative to the housing a predetermined distance, the rear end of the housing having a plate against which the cross-head on the drawbar abuts when the drawbar is fully retracted relative to the housing, and break-pins holding said brake in place.

8. A tractor hitch, including a housing, a forward drawbar disposed within the housing for longitudinal movement, a spring resisting the forward movement of the drawbar relative to the housing, the drawbar having thereon a head with a laterally beveled forward end, a rear drawbar disposed within the housing for longitudinal rearward movement, the drawbar having a cross-head at its forward end, laterally disposed latches engaging behind said cross-head, springs urging said latches inward, each of the latches having an inwardly extending beveled lug with which the beveled end of the head on the forward drawbar engages to shift the latches outward when the forward drawbar moves forward a predetermined distance, the cross-head on the rear drawbar having an upstanding member having its upper face beveled downward and forward, a bracket pivoted to the housing in front of said member and having a guide, a longitudinally extending rod slidable in said guide and having means at its forward end whereby it may be connected to the clutch and brake levers of a tractor, the rear end of the rod having a head engageable with the upstanding member on the cross-head, said head on the rod being beveled downward and inward, the housing rearward of the normal position of the head on said rod being formed with upwardly and rearwardly inclined elements adapted to engage said rod head and lift it upward to disengage it from the upstanding element on the cross-head of the rear drawbar.

9. A tractor hitch, including a housing, a forward drawbar disposed within the housing for longitudinal movement, a spring resisting the forward movement of the drawbar relative to the housing, the drawbar having thereon a head with a laterally beveled forward end, a rear drawbar disposed within the housing for longitudinal rearward movement, the drawbar having a cross-head at its forward end, laterally disposed latches engaging behind said cross-head, springs urging said latches inward, each of the latches having an inwardly extending beveled lug with which the beveled end of the head on the forward drawbar engages to shift the latches outward when the forward drawbar moves forward a predetermined distance, the cross-head on the rear drawbar having an upstanding member having its upper face beveled downward and forward, a bracket pivoted to the housing in front of said member and having a guide, a longitudinally extending rod slidable in said guide and having means at its forward end whereby it may be connected to the clutch and brake levers of a tractor, the rear end of the rod having a head engageable with the upstanding member on the cross-head, said head on the rod being beveled downward and inward, the housing rearward of the normal position of the head on said rod being formed with upwardly and rearwardly inclined elements adapted to engage said rod head and lift it upward to disengage it from the upstanding element on the cross-head of the rear drawbar, the rear end of the housing having an element against which the cross-head abuts when the drawbar has been drawn rearward relative to the housing a predetermined amount, said element being held in place by break-pins.

10. The combination of a tractor having a controlling lever, of a tractor hitch including a housing, a drawbar longitudinally movable within the housing and adapted to be connected to a drawn implement, a forward drawbar adapted to be connected to the tractor and movable longitudinally within the housing under predetermined strain, means latching the first-named drawbar to the housing and against longitudinal movement relative thereto, the second-named drawbar having means releasing said latching means upon a predetermined forward movement of the second-named drawbar relative to the housing, and means operatively connecting the first-named drawbar to the controlling lever of the tractor and constructed and arranged to shift the controlling lever to a position to stop the tractor when the first-named drawbar moves rearward relative to the housing.

EDDIE A. HILDE.